Nov. 10, 1931. H. A. EVANS 1,831,764
ORNAMENTAL PIPING, METHOD OF MAKING AND APPLYING, AND
ARTICLE OF MANUFACTURE CONTAINING THE SAME
Filed Feb. 11, 1928 2 Sheets-Sheet 1
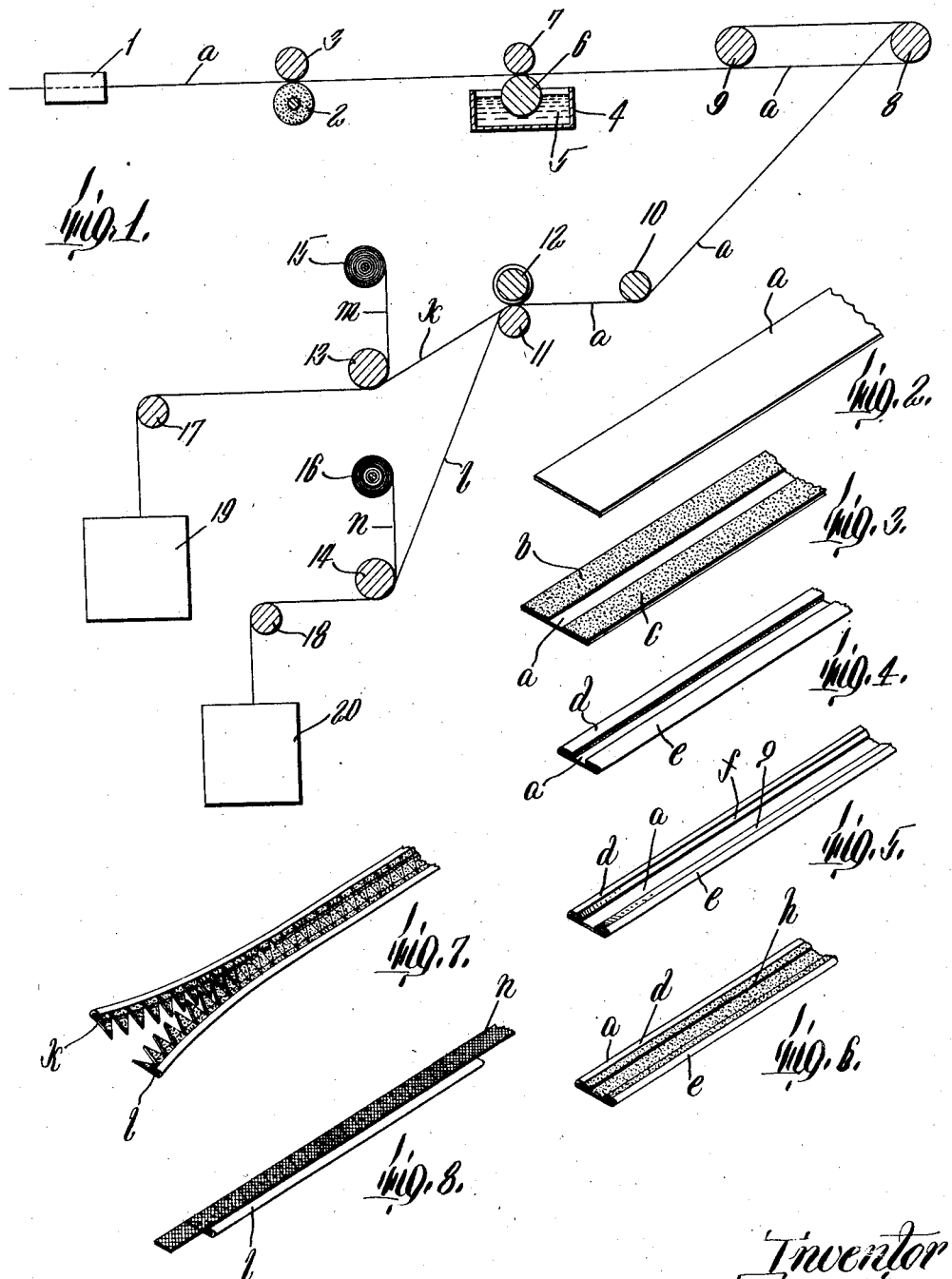

Nov. 10, 1931. H. A. EVANS 1,831,764
ORNAMENTAL PIPING, METHOD OF MAKING AND APPLYING, AND
ARTICLE OF MANUFACTURE CONTAINING THE SAME
Filed Feb. 11, 1928 2 Sheets-Sheet 2

Inventor
Harold A. Evans
by Wright, Brown, Quinby & May
Attys

Patented Nov. 10, 1931

1,831,764

UNITED STATES PATENT OFFICE

HAROLD A. EVANS, OF LYNN, MASSACHUSETTS, ASSIGNOR TO PARCO SPECIALTY CO., OF LYNN, MASSACHUSETTS, A CORPORATION OF MASSACHUSETTS

ORNAMENTAL PIPING, METHOD OF MAKING AND APPLYING, AND ARTICLE OF MANUFACTURE CONTAINING THE SAME

Application filed February 11, 1928. Serial No. 253,600.

This invention relates to strips used for ornamenting articles such as parts of shoes, other garments, and other sheet articles; and to the articles of manufacture containing such strips in their construction. It involves and comprises ornamental strips as articles of manufacture having new and useful characteristics, a new method of making such strips, a new mode of applying the strips having such characteristics to the seams between the parts of the articles to be ornamented thereby, and the new and improved articles of manufacture resulting from the application of the strips in the new manner referred to.

One particularly wide and important field of use of the invention is in the ornamentation of shoe uppers, for which reason I will in the following specification describe in detail the embodiment adapted for that use and its advantages; making it understood, however, that such detailed description is illustrative rather than limiting and that the invention may be applied to a variety of other analogous uses within the scope of the protection which I claim. One feature of prime importance in the invention is that the piping is adhesive, not only when prepared for use in shoe making, but for other uses as well, from which result economy in its application and greater strength in the shoe uppers and other leather goods in which the piping is incorporated, as compared with the articles containing piping applied by methods heretofore used. This and other features of utility and value are explained and set forth in the following specification.

In the drawings,—

Fig. 1 is a diagram illustrating the preferred method of making my improved piping; such method being a feature of the invention which I claim;

Figs. 2 to 8 inclusive are fragmentary perspective views illustrating successive steps in the manufacture of this piping, culminating in the finished article shown in Fig. 8;

Like reference characters designate the same parts wherever they occur in all the figures.

Figure 9:
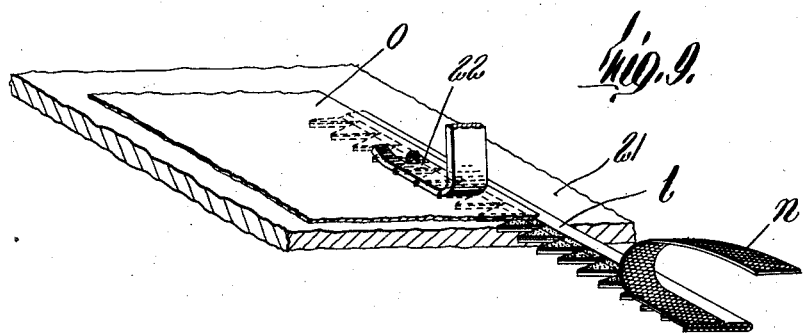
Fig. 9 is a fragmentary diagrammatic view illustrating the method of applying my improved piping to a part of a shoe upper or other article of manufacture.

Describing first the form of piping embodying this invention which at present I prefer to others, and the preferred method of making it, I first take a strip of the material commonly used for piping. That used in connection with leather goods is made of a thin skiving from the grain side of leather, as sheepskin, kid, calf, etc. The skivings from skins or pieces of skins are scarfed and matched together at their edges to make a sheet of substantial area, from which strips of the prescribed width are cut. These strips in turn are scarfed at their ends and glued together into a continuous ribbon of any length desired. Fig. 2 shows a fragment of such a ribbon designated $a$. This ribbon is coated on the flesh side with cement in two zones $b$ and $c$ along and adjacent to the opposite edges. Such zones are indicated in Fig. 3 with exaggerated thickness by shaded areas. While the cement thus applied may extend over the whole surface of the ribbon on the flesh side, I prefer to limit it to distinct zones each of a width equal to the flap at each edge of the ribbon which is afterwards folded over plus the area of the strip overlaid by such flap, leaving the zone exposed between the folded over flaps uncoated and thus in the best condition to take the adhesive which is afterwards applied, which may be of a different character, to make the finished piping tacky for attachment to the parts of the article with which it is to be used. Any ordinary or other suitable cement may be used for coating the zones $b$ and $c$.

I have not shown herein the means for applying the cement coating $b$ and $c$ to the ribbon. Any suitable means for that purpose may be used, such, for instance, as rolls in a tank of cement partly submerged and partly projecting above the cement in the tank and having suitable width and being suitably placed to apply the cement in the desired locations as the strip is drawn over them. I have, however, shown in Fig. 1, as a part of the diagram illustrating the further steps of converting the ribbon thus cement coated into the finished piping, a cement applying device of the type above described, which may be taken as an illustration of suitable means for cement coating the ribbon on the zones b and c. Other specific means may equally well be used.

After being coated as thus described, the ribbon passes through a series of operations substantially as shown diagrammatically in Fig. 1 with the results illustrated in Figs. 4, 5, 6, 7 and 8. First it passes through a folder 1 of a well known character, which bends up, doubles over and presses down the edges of the ribbon, such edges then forming the flaps d and e shown in Fig. 4, which cover the cemented zones b and c and are held by the cement in close union with middle part of the ribbon. The ribbon then has the smooth finished characteristics of the grain side of the leather at both edges and as far inward on the back side of the ribbon as the flaps extend. Folders suitable for this operation are well known and obtainable in the market, wherefore description in further detail of such a folder is unnecessary for the information of those skilled in the art to which this invention appertains.

Upon leaving the folder, the ribbon passes to a buffer consisting of an abrasive wheel or roll 2, against the circumference of which the ribbon is held by a presser roll 3. The buffing roll may be made of a core with a covering of sand paper or the like, or it may be made of abrasive material as a grinding wheel. It is made of less width on the face than the folded ribbon, and the latter is so guided that the buffing wheel removes the finish from the inner parts of the folded over flaps, from the inner edges thereof to lines at a prescribed distance from the folded edges of the strip, at the same time beveling the flaps to thin edges adjacent to the uncovered central zone of the ribbon. The surfaces thus buffed and beveled are indicated at f and g in Fig. 5. In order that the buffing wheel may thus bevel the flaps and not leave a sharp ledge or shoulder at the outer limit of the buffed zone, either the buffing wheel or the presser roll may be convex in the axial direction, similar to the longitudinal convexity of a barrel.

The buffing action has two effects. First it removes the grain or glaze on the surface of the flaps, making what is called a mat finish, that is, opening the pores and exposing the fibers of the leather beneath the grain surface, thus making these parts more readily absorptive and better retentive of the adhesive which is afterwards applied; and it largely removes the shoulders formed by the edges of the flaps, making substantially or nearly a continuous surface across the buffed zones and the intermediate body of the ribbon capable of receiving a film of adhesive of nearly uniform thickness over the entire area on which the adhesive is then applied. It may be noted that all the figures of the drawings in which the piping is shown in detail exaggerate the thickness of the ribbon and the parts thereof for clearness of illustration; inasmuch as the actual ribbon illustrated here is generally less than twenty thousandths of an inch in thickness and therefore too thin to be shown accurately to scale as to all dimensions. I may say further that in this same illustration the ribbon before folding is about eleven sixteenths of an inch in width and the folded flaps are about one eighth of an inch wide each, making the ribbon after folding about seven sixteenths of an inch wide; and that the buffed surfaces terminate about one sixteenth of an inch from each folded edge, leaving the finish unmarred by buffing as far inward from the edge as will be exposed to view when the piping has been applied to a shoe or other article of manufacture, but providing a wide enough surface for reception of adhesive to afford a firm union between the piping and the part to which it is applied. However, the figures above given are illustrative merely and may be varied without departing from the invention herein claimed.

A film or layer of adhesive, indicated in Fig. 6 by the shaded area h is then applied over the buffed zones and intermediate area of the strip. This may be done by such an apparatus as shown in Fig. 1 consisting of a tank 4 containing a quantity of adhesive 5 and provided with a roll 6 which dips into the adhesive while protruding above the surface thereof, and over which the strip is drawn. Being held in contact with the cement applying roll 6 by a presser roll 7, the friction of the strip rotates the roll, whereby the adhesive is constantly picked up and deposited by the roll on the strip. This cement applying means is also merely illustrative, and I may employ other means for accomplishing the same end.

As previously stated, the beveling of the folded over flaps, caused by the buffing operation, provides a sufficiently even surface to take a film of adhesive of substantially uniform thickness throughout its width. This is very important, for the uniform thickness of the adhesive gives uniform strength of adhesion throughout all parts of the coated area. I preferably use for the purpose of this adhesive coating a cement of thick consistency having a high degree of tackiness and of a quality such that it will remain sticky and flexible for long periods of time after evaporation of the excess solvent included with it to make it sufficiently fluid for application in the manner described; and having also the quality of being instantly adherent to the untreated surface of the leather or other pieces to which the piping is to be applied, preferably without preliminary treatment by heat or moisture. Such cements, some of them containing rubber in their composition, are now known and available on the market and are used for coating or impregnating adhesive tapes of various kinds. I may use any of these known cements, or any other compositions having the suitable qualities above indicated which may be known at the present time or may be developed in future. I prefer to apply it in such thickness or consistency that the tape will receive from the applying roll and retain, after drying to the extent later indicated, a film of six thousandths of an inch or thereabout in depth.

The cemented strip is then dried to the extent that the volatile solvents in its composition will pass off by evaporation into warm dry air, but not to the extent of losing its tacky quality. It may be dried by passing it around a pair of drums or rolls 8 and 9 in exposure to a blast or current of air, and in a sufficient number of parallel wraps or turns, spaced apart longitudinally of the drums, to be exposed a long enough time to the air current to be sufficiently dried before passing to the next operation. That is, the ribbon or strip first passes around the drum 8, then back and around the drum 9, then on again to the drum 8 in a path parallel to the path of its first passage, then back to the drum again, and so on; each pass or stretch of the tape between the drums being parallel to and separated from the other stretches thereof.

Leaving the drying apparatus, the tape is conducted under a guide roll 10 to a pinking machine consisting of a bed roll 11, or equivalent bed, and a cutting roll 12 equipped with knives in a zigzag arrangement which make zigzag connecting cuts through the cement coated zone of the strip and divide it into two piping strips $k$ and $l$, as shown in Fig. 7, each having deep tapering notches between correspondingly tapering tongues. The notches give flexibility to the piping, permitting it to be scharply bent to conform with corners or angles of the pieces to which it is to be applied, while the tongues provide adhesive surface of sufficient area and proper location to unite the piping firmly at all points to such pieces.

The piping is now complete so far as concerns its capacity for attachment; but in order to put it in marketable condition, that is, to protect the coated side so that it may be wound on spools or cards or in rolls for delivery to the trade, the further step of applying a protective covering is required. So the two strips of piping into which the ribbon has been divided are led in separate paths under rolls 13 and 14, by which strips $m$ and $n$, brought from reels 15 and 16, respectively, are applied to the coated side of the piping. Thence the pieces of piping are led over guides 17 and 18 into boxes or baskets 19 and 20, where they are allowed to remain for a short period of time to effect further tempering of the adhesive. Finally the piping is removed from the baskets and wound up on spools or cards in condition for delivery to the trade.

The strips $m$ and $n$, one of which is shown in Fig. 8, are strips of thin textile fabric of an inexpensive quality, cut on the bias in a width sufficient to cover substantially the whole area of the adhesive film on the piping. Several advantages result from using bias cut covering strips, one of which is that when the strip is pulled away from the piping preparatory to applying the latter, none of the threads of the strip will part from the strip and remain adhering to the piping, because all of the threads run diagonally and there are no longitudinal threads capable of leaving the interwoven cross threads at the edges of the strip. Another is that the diagonal arrangement of the threads allows the cover strip to stretch when pulled upon, which facilitates its release from the adhesive coating of the piping at the time of use. Preferably the cover strip is stiffened with starch or other size which somewhat binds together the interwoven threads of which it is made, giving it strength to withstand the pull applied in removing it from the piping and enabling it to stretch as described without pulling apart.

The cover strip prevents overlapping turns of the rolled up piping strip from adhering to each other and prevents the sticky side of one turn from marring or tearing off the finished surface of the turn over which it lies. This is particularly important with piping having a metallic finish in which the color is given by metal powder, which in some cases is easily rubbed off.

The method of manufacture hereinbefore described results in a superior article of piping, for the product is highly flexible, is adhesive on one side so that it can be united without stitching to the piece designed to receive it, and the adhesiveness extends far enough toward the finished (folded) edge to give a firm bond. It is also a highly economical method, for it is carried on continuously, the material passing from one operation to the next without pause or interruption, and the operation results in two finished articles. It is economical in material also, for the ribbon wide enough to make two piping strips need be only slightly wider than that required for one piping, and much less than the combined width of two. The pinking operation by which the strip is severed causes the material cut from the notches of one piping to form part of the substance of the other, instead of being wasted, as when separately made single piping is pinked. And the pinking is an advantage on account of the flexibility which it gives to the piping.

The piping may be enameled, dyed, lacquered or otherwise finished in any desired color at a suitable stage in its manufacture, either in the ribbon form or in the sheet before it is cut into ribbons, preferably the latter.

In applying the piping, it is united by its adhesive coating to one of the pieces which go into the finished article. It being so applied, the piping is laid against one of the surfaces of the piece with its finished edge projecting from the edge of the piece and its coated side against the adjacent surface of the piece. It may be so applied by hand or with the aid of a machine; and for rapid commercial production the use of a machine is preferable. This step is illustrated diagrammatically in Fig. 9. A suitable machine is an ordinary sewing machine having the usual table or bed, reciprocating presser foot, intermittent feeder, and gages; and from which the needle and thread have been removed. Or a special machine having the parts above named, or equivalent elements, may be provided or devised for the purpose.

In Fig. 9 the table or bed is shown at 21 and the presser at 22. The intermittent feeder, the gages, and the mechanisms for operating the movable parts are not shown, as these may be of the character well known in sewing machines, and the machine forms no part of the invention. In carrying out the operation the piping, designated in Fig. 9 as the piping $l$, is laid on the table 21 with the cemented side uppermost and the piece $o$ to which it is applied is laid on top of it under the presser and over the feed member, after a sufficient length of the cover strip $n$ has been pulled off. The operator, having started the machine, guides the piping strip and the piece $o$ under the presser, turning the piece as required to lay the piping along its curved or irregular edges and around the corners and angles thereof, causing the piping always to project a uniform given distance from the edge of the piece, and pulling off a length of the cover strip from time to time. In thus pulling off the strip the operator grasps it and removes a considerable length by a single sweep of the arm. The strip comes away cleanly from the piping, without leaving any threads adhering to the cement coating thereof, due to the diagonal arrangement of the threads composing the strip, and the stretching which is made possible by its biased form assists in detaching it from the adhesive. A firm contact is produced between the piece and the piping by the presser 22, such union being firm enough to prevent creeping of the piping on the piece during subsequent handling and particularly when the piece is afterwards stitched to another piece of the manufactured article and is turned back and forth in being passed through the sewing machine by which the seam uniting the pieces is sewed.

While other means than that above described may be used for feeding and uniting the piece $o$ and the piping may be used, as, for instance, a pair of continuously rotating rolls, I prefer such means as here described because the impact of the reciprocating presser tends to make a closer union between the piece and the piping, and the flatness of the presser and supporting table makes the united pieces smooth and flat and facilitates the guiding of the parts.

Figure 10:
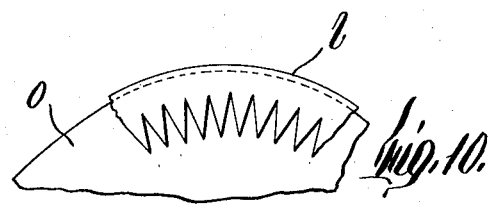
Fig. 10 is a fragmentary plan view of one of the pieces of a shoe upper with piping adhesively united thereto.

A fragment of the parts united by the procedure just described is shown in Fig. 10, this figure illustrating the manner in which the pinked piping is able to bend and conform with the bends or angles in the piece to which it is applied.

Figure 11:
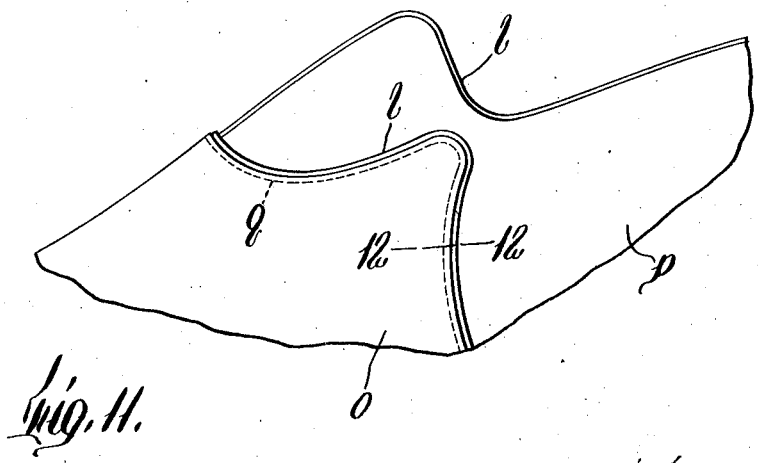
Fig. 11 is a fragmentary elevation showing part of a shoe upper made of pieces stitched together, with piping at the seam between such pieces and at the top edge of the upper.
Figure 12:
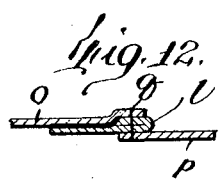
Fig. 12 is a sectional view of the seam taken on line 12—12 of Fig. 11.

The piping may be thus applied to the edge of any of the pieces which go to the making of a shoe or other article of manufacture. Fig. 11 shows a part of a shoe upper in which the piece $o$ with its adherent piping is stitched to another piece $p$ by a single seam $q$. The relation of these parts and the seam is further shown in the sectional view Fig. 12, where the seam is indicated by the transverse broken line. Fig. 11 further shows a piping applied to the edge of the piece $p$ which forms the edge of the upper, illustrating the fact that piping may be used to finish and ornament any of the edges of any of the pieces which go into the finished article, whether such edge is a free edge or the overlap of a seam.

That phase of the invention which consists in adhesively uniting the piping to the edge of a piece which is afterwards to be sewed to another piece has made an important advance in the art of shoe making and analogous manufactures, which may be best explained by comparison with the practices heretofore employed universally, or substantially so, in this art.

The use of piping in shoe uppers has long been known and valued as a very effective means of ornamentation, particularly of shoes for women's wear, since the piping obscures the raw edge of the overlapping piece of the upper leather at the seam, and also gives striking and beautiful ornamental effects. Hitherto it has been necessary in commercial manufacture to stitch the piping first to one of the pieces in order to secure the desired uniformity in the visible width of the piping, before sewing the ornamented piece to another piece. It is essential for neatness and attractiveness of finish that both seams, that for attaching the piping to the first piece and that for securing the pieces together, be stitched with a fine thread in short stitches, and that both seams be sewed in the same line in order to get the ornamental effect desired. Ordinarily the length of the stitches is in the neighborhood of one thirtieth of an inch and is hardly ever longer than one twentieth of an inch. In sewing the second seam, it is practically impossible to pass the needle through the holes made in stitching the first seam owing to the speed at which sewing machines in this class of work are run and the necessity of rapid production. Hence in most cases the piece to which the piping was first attached becomes pierced with two sets of needle holes in which the distance between adjacent holes is in some cases so slight that the holes merge into one another, and by which, together with the tightening of the stitches, the leather is greatly weakened. Consequently the leather is liable to tear along the line of the seam in the course of lasting or other subsequent operations in shoe making, particularly at the seam between the vamp and quarter when piping is applied there, for an especially heavy strain is then placed on that seam. The spoilage of shoes from this cause in course of manufacture, and the liability of a seam tearing apart after a short life in use after surviving the shoe making processes, has been so great as to exclude the use of piping from any seam to which a heavy strain is applied either in lasting or in subsequent wear, thus limiting seriously the scope of ornamentation left to the shoe maker.

In accordance with this invention, I have eliminated one of these seams and made it possible to apply piping to any seam without weakening the upper any more than is done in the ordinary and necessary operation of stitching the pieces together, and without incurring danger of spoiling the desired ornamental effect by failure to keep the exposed width of the piping uniform. Thus I have at one stroke enlarged the field of possible ornamentation by means of piping and removed a serious cause of waste and loss in manufacture by avoiding any weakening whatever of the ornamented seams due to the application of the piping. Piping having the characteristics described may be used in the manufacture of pocket books and other leather goods, as well as in articles made of other materials than leather. That phase of the invention which consists in providing a piping with an adhesive side or face is not limited in respect to the material of the piping but may be embodied in pipings made of other material than leather.

While the invention herein claimed has for the purposes of illustration been described for use as piping, it will of course be understood that it has other uses and that the claims cover the material for any use to which it is applicable.

What I claim and desire to secure by Letters Patent is:

1. The method of making an ornamental strip which consists in taking a ribbon-like strip of suitable material, applying adhesive to the rear face of the strip adjacent to an edge thereof, folding over the edge portion of the ribbon against the adhesive so applied and on a line so near to said edge that the part so folded leaves a substantial proportion of the rear surface of the strip exposed, and laying a film of substantially non-drying adhesive on said exposed surface.

2. The method of making an ornamental strip which consists in taking a ribbon-like strip of suitable material, folding over longitudinal flaps from both edges of the strip upon the rear face thereof and uniting such flaps thereto by adhesive, at the same time making the flaps so narrow that a substantial width of the rear face of the strip is exposed between them, applying a film of substantially non-drying adhesive to the said exposed rear surface, and dividing the strip between said flaps into two strips.

3. The method of making an ornamental strip which consists in taking a ribbon-like strip of suitable material, applying adhesive to one face of the strip adjacent to an edge thereof, turning over the edge portion of the ribbon as a flap and uniting it to the body of the ribbon by the adhesive so applied, and laying a film of substantially non-drying adhesive on the same side of the strip and a portion of the outer side of such flap.

4. The method of making piping which consists in folding the edge portion of a ribbon-like strip of leather against the back face of the strip and securing the flap so folded back by adhesive, buffing the flap so folded back at and near its edge but not out to the fold of the ribbon, and applying a continuous film of adhesive upon the back side of the strip and on the buffed area of the flap.

5. The method of making an ornamental strip which consists in taking a ribbon-like strip of suitable material, folding over longitudinal flaps from both edges of the strip upon the rear face of the strip and uniting such flaps thereto by adhesive, applying a film of cement on the rear face of the strip and partially over the flaps but not as far out as the edge folds of the strip, and cutting the strip between its edge folds into two strips.

6. The method of making an ornamental strip which consists in taking a ribbon-like strip of suitable material, folding over longitudinal flaps from both edges of the strip upon the rear face of the strip and uniting such flaps thereto by adhesive, applying a film of cement on the rear face of the strip and partially over the flaps but not as far out as the edge folds of the strip, and making a zigzag cut in the strip between the edge folds thereof, thereby dividing the same into two strips, each notched or pinked inward from the edge opposite to the fold.

7. The method of making piping which consists in taking a ribbon-like strip of thin leather having the grain surface of the leather on one side, applying cement to the flesh side of the strip lengthwise adjacent to an edge thereof, doubling over the edge portion of the ribbon upon the cement so applied forming a flap which is thereby held fast to the surface of the strip, buffing off the grain surface of the flap from its edge to a line spaced inward from the fold so made, and applying a film of adhesive to the flesh side of the strip and the buffed area of the flap.

8. The method of making piping in a continuous operation which consists in taking a thin strip of leather having a grain surface on one side, folding over both edges of the strip upon the flesh side of the strip and uniting the flaps so formed to the flesh surface by adhesive, buffing the grain side of said flaps and thereby making their edges thinner and removing the surface finish thereof, to lines terminating at given distances within the edge folds of the strip, laying a film of adhesive of substantially uniform thickness upon the buffed surfaces of the flaps and the intermediate surface of the strip, semi-drying the film so applied, and cutting the strip between the edge folds by a series of connected zigzag cuts thereby dividing the strip into two pipings, each having a pinked edge opposite to the folded edge.

9. The method of making piping in a continuous operation which consists in taking a thin strip of leather having a grain surface on one side, folding over both edges of the strip upon the flesh side of the strip and uniting the flaps so formed to the flesh surface by adhesive, buffing the grain side of said flaps and thereby making their edges thinner and removing the surface finish thereof, to lines terminating at given distances within the edge folds of the strip, laying a film of adhesive of substantially uniform thickness upon the buffed surfaces of the flaps and the intermediate surface of the strip, semi-drying the film so applied, cutting the strip between the edge folds by a series of connected zigzag cuts thereby dividing the strip into two pipings, each having a pinked edge opposite to the folded edge, and applying a temporary cover strip of bias cut textile material to each of the pipings so formed.

10. An ornamental strip consisting of a strip having a doubled over edge flap and a film of adhesive covering the inner portion of such flap and the surface of the strip adjacent to the flap but terminating at a distance inward from the edge fold of the strip.

11. A piping consisting of a strip of grain leather having an edge flap folded back on the flesh side of the strip and provided with a mat surface from a line at a distance inward from the fold to the edge of such flap, and a layer of adhesive overlying the mat surface of the flap and the adjacent flesh surface of the strip.

12. The method of applying piping to the parts of a manufactured article which consists in laying and adhesively uniting a piping to the surface of one of such parts adjacent to the edge thereof so that the edge of the piping projects beyond such edge, laying said part against another part of the article with the piping between them, and uniting said parts together by a seam the stitches of which pass through both pieces and the piping.

13. The method of applying piping to an article of manufacture which consists in cementing without sewing a piping strip to one of the component pieces of such article, and stitching a second piece to the first named piece and the piping with a single seam.

14. An article of manufacture comprising two overlapping pieces of material and an interposed piping stitched together on a single seam, with a flexible adhesive between the contiguous surfaces of one of said pieces and the piping.

15. An article of manufacture comprising a piping, a second part, a flexible film of adhesive between contiguous surfaces of said parts, uniting them together, and a third part sewed to the piping and the before named second part and arranged at the opposite side of the piping from the said second part.

16. A shoe upper comprising a leather piece, a piping adhesively united to such leather piece and protruding from one edge thereof, and a second leather piece underlapping the first named piece and the piping, said pieces being united by a sewed seam, the stitches of which pass through the piping.

17. An article of manufacture comprising a piece constituting a structural part of the article, a piping adhesively united to such piece and protruding at its edge from one edge of said piece, a second piece of the article underlapping the first named piece and the piping, and stitches uniting the said pieces and the piping to one another; all such stitches passing through both said pieces and the piping.

18. Method of ornamenting sheet articles comprising the application of adhesive to one face of an elongate strip, turning over an edge of the strip as a flap and uniting it to the body of the strip by the adhesive so applied, applying a film of cement on the face of the strip beside said flap while leaving the surface of said flap adjoining the fold uncoated, severing a piece of the resulting adhesively coated ribbon from the elongate strip, applying the film of cement on said severed piece in adhesive engagement with the margin of a sheet, and stitching the portion of the flap adjoining the fold to the edge of the sheet.

19. Method of ornamenting sheet articles comprising the application of adhesive to one face of an elongate strip, turning over an edge of the strip as a flap and uniting it to the body of the strip by the adhesive so applied, applying a film of cement on the face of the strip beside said flap and over its inner edge while leaving the surface of said flap adjoining the fold uncoated, severing a piece of the resulting adhesively coated ribbon from the elongate strip, applying the film of cement on said severed piece in adhesive engagement with the margin of a sheet, and stitching the portion of the flap adjoining the fold which is uncoated to the edge of the sheet.

20. An article of manufacture comprising two pieces of material and an interposed piping stitched together, with the edge of the piping protruding beyond the edge of one of said pieces and a flexible adhesive cement between the contiguous surfaces of such piping and one of the pieces of material.

21. An article of manufacture comprising overlapping pieces of leather and an interposed piping between them, an adhesive bonding medium between one of such pieces and the piping, and stitches uniting the said parts together, all of such stitches passing through all of the above named parts.

22. A shoe upper comprising a leather piece, a piping adhesively united to such leather piece, and a second piece underlapping the first piece and at the opposite side of the piping therefrom, said pieces being united by a single sewed seam, the stitches of which pass through the piping.

23. The method of applying piping to the parts of a manufactured article which consists in laying and adhesively uniting a pipping to one of such parts, laying such part against another part of the article with the piping between them, and uniting the parts together by a seam, the stitches of which pass through both pieces and the piping.

24. The method of making an ornamental ribbon for application to a sheet article, of the type having an adhesive coating on one marginal surface and having its opposite marginal surface free from said coating more readily to receive stitching, which comprises applying to the central part of a strip of suitable material a stripe of cement capable of later adhesive application to a sheet article and having substantially less width than the strip, while leaving marginal zones of sufficient width to receive stitching free from said cement coating at each side of the stripe, and cutting the strip intermediate the edges of the stripe, thus dividing the strip into two ribbons, each of which has a marginal portion adhesively coated and an opposite marginal portion of sufficient width to receive stitching free from said coating.

In testimony whereof I have affixed my signature.

HAROLD A. EVANS.

DISCLAIMER 1,831,764.—*Harold A. Evans*, Lynn, Mass. ORNAMENTAL PIPING, METHOD OF MAKING AND APPLYING, AN ARTICLE OF MANUFACTURE CONTAINING THE SAME. Patent dated November 10, 1931. Disclaimer filed October 1, 1932, by the patentee, said *Evans*, the assignee, *Parco Specialty Company*, and the *United Stay Company, Inc.*, exclusive licensee.

Hereby enter this disclaimer.

Disclaim the respective subjects matter of claims 10, 18, and 19, except when the film is capable for a substantially indefinite period of adhesive attachment to a sheet to be ornamented, whereby the strip is adapted to be merchandised for subsequent adhesive application.

Disclaim entirely claims 12, 13, 14, 15, 16, 17, 20, 21, 22, and 23.

[*Official Gazette October 25, 1932.*]